July 9, 1935. O. V. PAYNE Re. 19,641
PNEUMATIC WEFT DETECTING MECHANISM FOR LOOMS
Original Filed Jan. 9, 1933
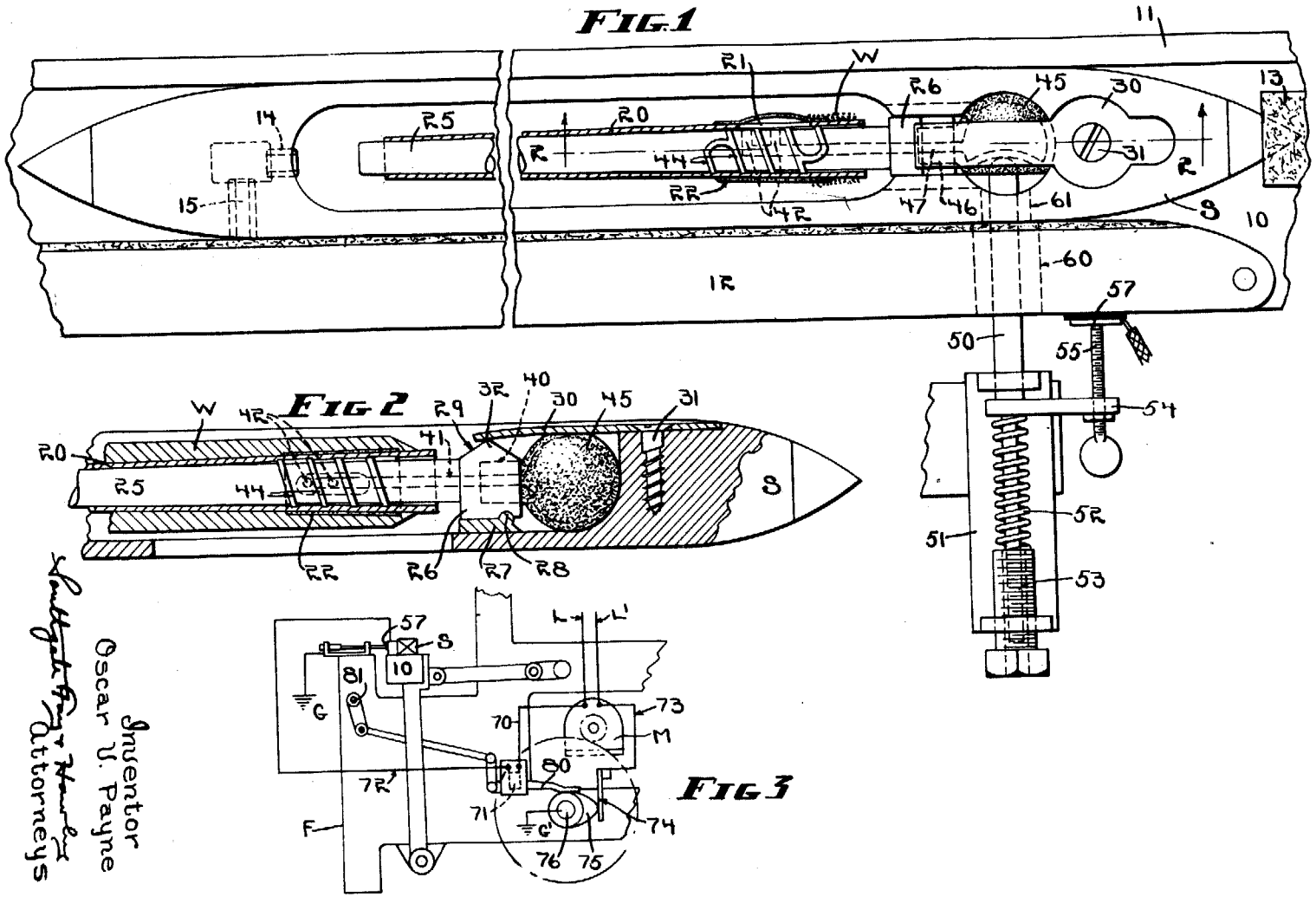
Inventor
Oscar V. Payne
Southgate Gray & Hawley
Attorneys Reissued July 9, 1935

Re. 19,641

UNITED STATES PATENT OFFICE 19,641

PNEUMATIC WEFT DETECTING MECHANISM FOR LOOMS

Oscar V. Payne, Leicester, Mass., assignor to Crompton & Knowles Loom Works, Worcester, Mass., a corporation of Massachusetts Original No. 1,977,083, dated October 16, 1934, Serial No. 650,834, January 9, 1933. Application for reissue December 24, 1934, Serial No. 759,117

19 Claims. (Cl. 139—269)

This invention relates to mechanism for detecting substantial exhaustion of weft in a loom shuttle, whereby weft replenishment or loom stoppage may be effected.

It is the general object of my invention to provide improved mechanism by which the condition of the weft supply in the active shuttle may be determined without mechanical engagement of the weft by any moving part.

My invention further relates to arrangements and combinations of parts which will be hereinafter described and more particularly pointed out in the appended claims.

A preferred form of the invention is shown in the drawing, in which

Fig. 1 is a plan view of my improved detecting mechanism, with the weft carrier shown in section;

Fig. 2 is a partial sectional side elevation, taken along the line 2—2 in Fig. 1, and Fig. 3 is a diagrammatic view showing certain electrical connections.

Referring to Figs. 1 and 2, I have shown a portion of a lay 10 having a back box plate 11, front binder 12 and picker 13 which provide a box for the shuttle S. The shuttle S is of a usual type and is shown as provided with guides 14 and 15 through which the weft W is threaded.

The weft W is indicated as wound on a cop tube 20 having a slot 21 disposed at one side thereof and near the base of the cop. A sleeve 22 of thin rubber or other similar and suitable material is mounted on the cop tube 20 and covers the slot 21.

The cop tube 20 is positioned in the shuttle by placing the tube on a shuttle spindle 25 having a base portion 26 (Fig. 2) resting on a block 27 and notched to receive a pivotal projecting portion 28 of the block 27.

The upper face of the base 26 is formed with two oppositely inclined faces 29 and is engaged by a flat spring 30 which is secured in a recess in the top of the shuttle by a screw 31. The apex 32 of the spindle base 26 is off-center with respect to the pivotal projection 28, so that the spring 30 holds the spindle firmly in horizontal position during loom operation, as clearly indicated in Fig. 2.

When the weft supply is to be replenished, the spindle 25 is swung partially upward and the spring 30 engages one of the inclined faces 29 to hold the spindle in upwardly inclined position during the replacement of the exhausted weft carrier.

The spindle 25 is provided with a recess 40 in its base 26 and with an axial passage 41 communicating with one or more transverse passages 42. These transverse passages are preferably positioned between helical ribs 44 on the outer face of the spindle 25, these ribs being of sufficient height so that a continuous air passage is formed from the transverse openings 42 to the slot 21 in the cop tube 20, regardless of the angular position of the slot 21 with reference to the transverse passages 42.

An air container, preferably in the form of a rubber ball 45, is mounted in a recess in the shuttle below the spring 30 and is provided with an extension 46 snugly fitting in the recess 40 and having an axial passage 47 communicating with the passage 41 in the spindle 25.

A plunger 50 is mounted in a stand or bracket 51 on the loom frame and is pressed yieldingly rearward by a coil spring 52. The pressure of the spring may be varied by an adjusting screw 53. The plunger 50 is also provided with a cross arm 54 in which a contact screw 55 is adjustably mounted.

As the lay 10 moves forward, the plunger 50 enters a slot 60 in the binder 12 and an opening 61 inside of the shuttle S and engages the side of the rubber ball or air container 45.

If the ball resists deflation, the plunger 50 is moved forward with the lay, and the contact screw 55 is held out of engagement with a contact plate 57 on the front of the binder 12. If, on the other hand, the ball 45 does not resist deflation, the parts assume the position shown in Fig. 1, with the screw 55 engaging the plate 57 and completing an electrical circuit by which loom stoppage is effected.

The mechanism for stopping the loom on completion of the electrical circuit forms no part of my present invention and reference is made to my prior Patent #1,873,465, issued August 23, 1932 for a full disclosure of such mechanism.

This mechanism is indicated diagrammatically in Fig. 3, in which a line wire L is connected through a wire 70, solenoid 71 and wire 72 to the contact plate 57 and thence through the screw 55 to a ground on the loom frame F, as indicated at G in Fig. 3.

The other line wire L′ is connected through a wire 73 to an arm 74 which is engaged by a cam 75 on the bottom shaft 76 at each revolution of the bottom shaft and at each alternate forward movement of the lay 10. The cam 75 is likewise grounded on the loom frame F as indicated at G′. The motor M for driving the loom may be connected in parallel to the same power circuit if so desired.

The operation of the loom-stopping mechanism is such that the closing of the circuit through the solenoid 71, upon engagement of the contact screw 55 with the plate 57, renders the cam 75 effective through a lever 80 to actuate the knock-off shaft 81 and thus stop the loom. For a more complete description of this mechanism, reference is made to my prior patent above identified.

When the active shuttle S contains a weft carrier or cop tube having a sufficient supply of weft W thereon, as indicated in Fig. 2, the rubber sleeve 22 is held tightly over the slot 21 and is held in close engagement with the cop tube 20 at both ends of the slot 21. Accordingly, the air in the ball 45 is unable to escape when the ball is engaged by the plunger 50, and consequently the plunger 50 is moved forward, preventing contact of the screw 55 with the plate 57.

When the weft supply is substantially exhausted, as indicated in Fig. 1, there will remain only a few turns of weft at the extreme bottom of the cop tube 20 and overlying the bottom end only of the rubber sleeve 22. Consequently, when the ball 45 is then engaged by the plunger 50, the ball is partially deflated, either by escape of air from the free end of the sleeve 22 or by the outward expansion of the thin sleeve 22, as indicated in Fig. 1. In either event, sufficient air escapes from the ball 45 to permit the screw 55 to engage the contact plate 57 and complete the electrical circuit, thereby causing stoppage of the loom.

By the provision of the helical ribs 44, I make it unnecessary to align the slot 21 with the transverse passages 42 when placing the cop tube on the spindle.

It will be obvious that when the shuttle S is at the opposite side of the loom there will be nothing to prevent contact of the screw 55 with the plate 57. For that reason I have provided the arm 74 which must be engaged by the cam 75 to complete the electrical circuit. Such engagement takes place only when the shuttle S is at the detecting side of the loom, but when the shuttle is at the opposite side the circuit is broken between the parts 74 and 75 so that no indication of loom stoppage can be given.

My improved detecting mechanism is particularly desirable for use with silk or other fine or delicate weft threads, as no mechanical element engages the weft in the detecting operation, as has been customary in weft detectors previously in commercial use. The operation of the detecting mechanism depends entirely on the retention or escape of air from the rubber ball 45, and the escape of air is directly controlled by the presence or absence of the final layer of weft windings about the middle and left-hand portions of the rubber sleeve 22 (as viewed in Figs. 1 and 2).

The manner of pivotally supporting the spindle 25 is not claimed herein, but forms the subject matter of my copending application Serial No. 739,033, filed August 9, 1934.

Having thus described my invention and the advantages thereof, I do not wish to be limited to the details herein disclosed, otherwise than as set forth in the claims, but what I claim is:—

1. In a loom, a shuttle, means in said shuttle effective to confine a definite volume of air, and means to indicate loom stoppage when a substantial portion of said air is ejected, said latter means being normally held from indicating action by the air confined in said first-named means.

2. In a loom, an air-containing member, means to retain air in said member, and means to indicate a change in loom operation when a substantial portion of said air is ejected, said means being normally held from indicating action by the air confined in said member.

3. In a loom, an air-containing member, means to normally retain air in said member, said means becoming inoperative to retain air on substantial weft exhaustion, and means to indicate a change in loom operation when a substantial portion of said air is ejected, said latter means being normally held from indicating action by the air confined in said member.

4. In a loom, an air-containing member, means to normally retain air in said member, said means being rendered effective to retain air by a substantial supply of weft in said shuttle, and means to indicate a change in loom operation when a substantial portion of said air is ejected, said latter means being normally held from indicating action by the air confined in said member.

5. In a loom, a shuttle having an air-containing member, means to normally retain air in said member, said means being rendered effective to retain air by a substantial supply of weft in said shuttle, and means to indicate a change in loom operation when the weft in said shuttle is substantially exhausted, thereby permitting a substantial portion of said air to be ejected, said latter means being normally held from indicating action by the air confined in said member.

6. In a loom, a shuttle having a deflatable air container mounted therein, and detecting means yieldingly engaging said air container at each alternate forward movement of the lay, said detecting means becoming operative to effect a change in loom operation only on partial deflation of said air container, and said detecting means being normally held from indicating action by the air confined in said container.

7. In a loom, a shuttle having a deflatable air container mounted therein, and detecting means yieldingly engaging said air container at each alternate forward movement of the lay, said detecting means becoming operative to effect a change in loom operation only on partial deflation of said air container and said detecting means being normally held from indicating action by the air confined in said container, and said air container being deflatable by said detector only in the absence of a sufficient weft supply on the weft carrier in said shuttle.

8. In a loom, a shuttle, a deflatable air container mounted in said shuttle, means including a weft carrier and the weft thereon by which escape of air from said container is controlled, and means to give an indication of substantial weft exhaustion when a substantial portion of said air is ejected from said air container.

9. In a loom, a shuttle having a spindle to support a weft carrier, said spindle having an axial passage with a peripheral outlet, an air container connected to said axial passage, and means to partially deflate said air container on the occurrence of substantial exhaustion of weft on said weft carrier.

10. The combination in a loom as set forth in claim 9, in which the spindle is provided with external ribs at each side of said outlet defining air passages around said spindle and between the body of said spindle and a weft carrier mounted thereon.

11. In a loom, a shuttle having a spindle with a peripheral air outlet, a deflatable air container connected to said outlet, a cop tube having a peripheral air opening communicating with said air outlet when said tube is in operative position on said spindle, yielding detecting means engaging said air container, and means to retain the air in said container while a sufficient weft supply remains on said cop tube.

12. The combination in a loom as set forth in claim 11, in which said latter means comprises a thin rubber sleeve snugly fitting said cop tube and covering the peripheral opening therein, said sleeve being expansible when a portion of the weft wound thereon is removed.

13. The combination in a loom as set forth in claim 11, in which said latter means comprises a thin rubber sleeve snugly fitting said cop tube and covering the peripheral opening therein, the middle portion of said sleeve being expansible when the weft wound thereon is removed.

14. The combination in a loom as set forth in claim 11, in which said latter means comprises a thin rubber sleeve snugly fitting said cop tube and covering the peripheral opening therein, said middle portion of said sleeve and the end portion nearer the tip of the cop tube being expansible when the weft wound thereon is removed.

15. A loom shuttle having a spindle with an air passage extending longitudinally of said spindle, a pivotal support for the head of said spindle, and a deflatable air container mounted in said shuttle and flexibly communicating with said passage at the pivoted end of said spindle.

16. A loom shuttle having a spindle with an air passage extending longitudinally of said spindle and a lateral air opening connected to said air passage, a pivotal support for the head of said spindle, and a deflatable air container mounted in said shuttle and pneumatically communicating with said passage at the pivoted end of said spindle.

17. A loom shuttle having a spindle with an air passage extending longitudinally of said spindle, a pivotal support for the head of said spindle, and a deflatable air container pneumatically communicating with said passage at the pivoted end of said spindle, said shuttle having a recess therein to receive said air container and having a lateral opening to said recess adapted to admit a deflating member.

18. A loom shuttle having a spindle with an air passage extending longitudinally of said spindle and a lateral air opening connected to said air passage, a pivotal support for the head of said spindle, and a deflatable air container mounted in said shuttle and pneumatically communicating with said passage at the pivoted end of said spindle, said lateral air opening coacting for indication of weft exhaustion with a cop tube having an opening in its side wall covered with a yieldable but air-resistant material.

19. In a loom, a shuttle and pneumatic weft detecting apparatus associated therewith, said apparatus comprising a hollow deformable member mounted in said shuttle and forming a part thereof, means including a weft carrier having weft thereon and thereby rendered effective to prevent escape of air from said member, and a detector mounted externally to said shuttle and having a portion entering said shuttle as the shuttle swings toward said detector, and said detector being engaged by said deformable member and being moved thereby to non-indicating position if a sufficient supply of weft on said weft carrier prevents deflation of said deformable member.

OSCAR V. PAYNE.